United States Patent Office 3,133,722
Patented May 19, 1964

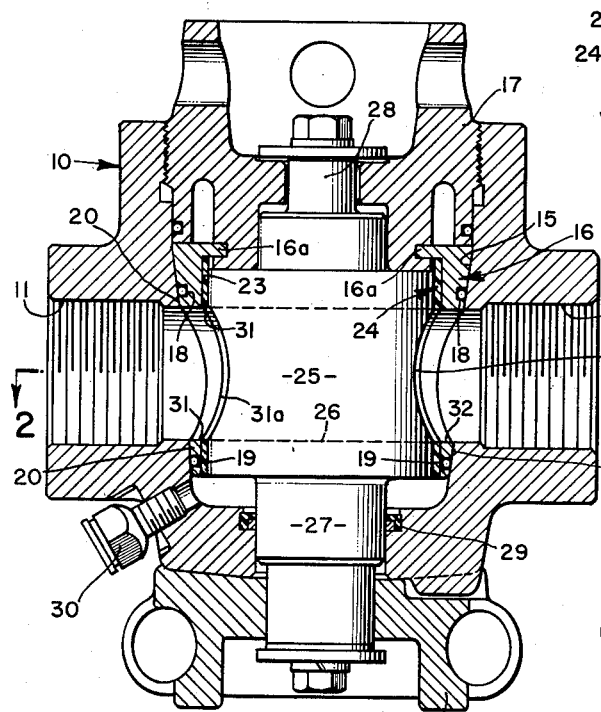

3,133,722
PLUG VALVE WITH REMOVABLE INSERT
AND LINER MEANS
Jack C. McGuire and James A. Frye, Duncan, Okla.,
assignors to Halliburton Company, Duncan, Okla., a
corporation of Delaware
Filed July 31, 1961, Ser. No. 128,150
8 Claims. (Cl. 251—309)

This invention relates to plug valves and more particularly to plug valves used in lines subjected to extremely high pressures. In U.S. Patents 2,813,695 to Stogner and 2,911,187 to Owsley, there are disclosed plug valves which have been found to have very important advantages when used in high pressure lines. They employ a tapered insert, which fits in a tapered bore in the valve body and serves as a bearing for the valve plug. The insert is provided with circular grooves in which O-rings are mounted to maintain seals adjacent the inlet and outlet passageways through the valve body and prevent leakage between the valve body and the insert. The cutting of the circular grooves in the insert provides lands, the upstream land being subject to high fluid pressure and being adapted to deform and press against the plug when the valve is closed, thus preventing leakage.

Extensive field use of the valves of said patents has proven that they have exceptional operational characteristics. However, the construction of the valves is such as to tend to limit maximum efficiency of utilization thereof under all possible service conditions, some difficulties being experienced when used in corrosive environments, such as in corrosive water service lines. Also, periodic lubrication of the valves is required for maintenance of the reasonably low torque requirements which are characteristic of such valves.

An object of the present invention is to provide an improved valve of the type disclosed in the above cited Stogner and Owsley patents.

A further object of this invention is to provide a high pressure plug valve of the type having a tapered insert bearing, the valve having improved corrosion-resistant characteristics, and requiring low operational torque, even in the absence of lubrication of the moving parts thereof.

A further object of the present invention is to provide a high pressure plug valve capable of use under widely varying service conditions of temperature, pressure and corrosive influences, the valve being operable with low torque requirements even after long periods of non-use.

Other objects and advantages of this invention it is believed will be readily apparent from the following detailed description of a preferred embodiment thereof when read in connection with the accompanying drawings.

In the drawings:

FIGURE 1 is a vertical cross-sectional view of a valve constructed in accordance with the principles of the present invention.

FIGURE 2 is a sectional view taken substantially on the line 2—2 of FIGURE 1.

FIGURE 3 is an exploded perspective view of the insert and insert liner of the valve of FIGURE 1.

FIGURE 4 is a fragmentary side elevation, partly in section, of the liner.

FIGURE 5 is a sectional plan view taken substantially on the line 5—5 of FIGURE 4.

Referring now to the drawings, the valve of the present invention is therein illustrated as including a main valve body 10 provided with inlet and outlet passageways 11 and 12. The passageways are preferably threaded as shown to make connections with the pipe (not shown).

The valve body 10 is provided with a tapered bore 15 at right angles to the passageways 11 and 12. Within this tapered bore there is an insert 16 which houses a cylindrical plug 25, and this insert 16 is split longitudinally so as to provide two sections. The edges of the two sections are shown at an angle of about 45° with respect to the axis of the passageways 11 and 12, but if desired the planes of said edges may intersect the axis of the inlet and outlet passageways at some other angle, such as, for example, 60°. The plug 25 has an ordinary passageway 26, and in the embodiment shown the plug can be rotated 90° without the passageway 26 completely crossing the edges of the two sections of the insert 16. The insert 16 has an outer tapered or conical surface conforming to the taper of the bore 15. The inner surface or bore 23 of the insert 16 is cylindrical, and interposed between the insert and the plug 25 is a cylindrical liner 24. The liner 24 is preferably bonded to and forms a part of the insert 16, the liner being split longitudinally into two sections in the same manner as the insert 16. When mounted in the bore 15, the insert and liner may be forced downwardly by a suitable cap 17 threaded into the top of the tapered bore 15 of the valve body. It is to be noted that a force thus applied resolves into a normal contacting force between the lined insert 16 and the plug 25 which will be proportional to the downward force applied.

The insert 16 is provided with passageways 31 and 32 aligned with passageways 11 and 12. It also has two circular grooves 18, one concentric with each of the passageways 31 and 32. Suitable O-rings 19 are mounted in these grooves 18 so as to maintain a seal between the bore 15 and the insert 16. The arrangement is such that there is an annular land 20 on each side of the insert 16 concentric with the passageways 31 and 32. These lands 20 may be referred to as the areas which, when subjected to pressure, tend to deform the insert. For example, assuming that the passageway 12 is the inlet of the valve, the land 20 at the right of FIGURE 1 is subjected to the pressure of the fluid in the passageway 12 when the valve is closed, i.e., rotated 90° from the position as shown in FIGURE 1. Due partly to the resiliency of the insert 16 and due partly to the reduced sectional area at groove 18, the lands 20 are supported on the remainder of insert 16 with some flexibility. Upon the inlet land 20 being subjected to fluid pressure, said pressure is transmitted to a like area of the interior cylindrical surface of the insert bore 23 and, in turn, a like area of the liner 24. This pressure, when applied, is in addition to that imposed by cap 17. Also of note is the fact that the O-rings 19 obviate the need for a lapped contact surface between the insert 16 and the bore 15.

At a suitable point adjacent one of the lands 20, the insert 16 is provided with a small relief port 22, as described in said Owsley Patent 2,911,187. The relief port 22 is located in the path of the passageway 26 of the plug 25 when the passageway 26 is turned from its closed position to a point immediately adjacent the inlet passageway 12 of the valve body 10.

The insert 16 is held against rotation within the valve body at all times. The means for holding it against rotation may be of any suitable form. In the arrangement illustrated, grooves are provided on the insert as shown at 21, and suitable pins (not shown) are mounted in the valve body 10 and these project into the grooves 21. The insert 16 is provided with a flange 16a at its base or larger end. The plug 25 abuts against this flange so that the plug and insert move together, axially, and upwardly when the plug is subjected to hydraulic forces which tend to lift it. The plug has cylindrical projections 27 and 28 thereon for mounting it in the valve body 10 and in the cap 17 as illustrated. Suitable packing is provided as shown at 29 to prevent leakage through the valve body and cap, and the spaces between the plug 25 and the packing 29 may be suitably lubricated, a fitting 30 being provided for such purpose.

In the drawings, the valve is shown in the opened position. To rotate the valve to the closed position, a handle adapter 37, designed to receive a handle (not shown), is provided. Some means should be provided to limit rotation of the plug to 90°. As viewed in FIGURE 2, the plug 25 should be rotated in a counterclockwise direction to close it. Means should be provided to prevent the plug from rotating clockwise from the position shown in FIGURE 2 so as to insure against the passageway 26 traveling across the joints of the two sections of insert 16 and of the liner 24.

The liner 24 is made of a plastic material having a low-coefficient of friction and good corrosion and abrasion-resistant properties. A material eminently suited is polytetrafluoroethylene or other fluorocarbon resins, preferably reinforced as by the inclusion of glass fibers, asbestos, quartz, mica, ceramic fibers, bronze, copper, molybdenum disulfide and other metals capable of withstanding the temperatures encountered under service conditions. In the preferred embodiment shown, the liner 24 is composed of two segments of 15% glass-filled "Teflon," molded around a perforated plate 24a of steel or the like, the Teflon completely enclosing the plate on the sides and edges thereof as shown in FIGURES 4 and 5.

In the assembly of the liner 24 and insert 16, the insert is machined in one piece, the inside surface thereof is roughened as by sand blasting and an adhesive such as an epoxy resin is applied to the thus prepared surface. The outer surfaces of the two liner segments are etched to prepare them for the adhesive and the surfaces are coated with the same epoxy adhesive. The prepared parts are then assembled in a bonding fixture or jig in which the liner segments are forced into proper alignment and contact with the inner surface of the insert 16, and the asembly is heated under conditions to cure the adhesive. The assembly is then machined to the desired inside diameter, the ports 22 are drilled and finished, and the insert is split into the two segments shown. The operation of the valve is essentially the same as described in said Owsley patent, however, great improvement in the performance of the valve under rigorous operating conditions is obtained by the incorporation of the liner 24. Thus, when the valve illustrated is used in a high pressure line in a closed position, extreme pressure will be exerted on the land 20 found on the inlet side of the valve. The O-ring 19 adjacent that land will prevent the high pressure from being exerted over the area of the insert exterior of the groove 18.

Ordinarily, there is no leakage past the O-ring 19 on the upstream side of the valve, and no leakage between the insert and the upstream side of the plug due to the deformation of the land 20 against the upstream side of the plug. However, should even the slightest amount of leakage occur, the entire valve body 10 will swell, and the plug 25 and lined insert 16 will then be eccentrically disposed in the body 10. Most of the sealing of the valve will then be on the downstream side, and the entire cavity of the valve body 10 will be subjected to the upstream pressure.

Under such extreme conditions, when the plug is rotated to the "cracked," open position, a certain amount of extrusion of the insert into the bore 26 of the plug 25 tends to take place. The port 22, which extends through the wall of the insert 16 and of the liner 24, performs the same function here as in the said Owsley patent structure, in preventing extrusion of the lined insert 16 into the bore 26 of the plug and the resultant "locking" of the insert to the plug.

The structure of the present invention, with the liner 24, permits use of the valve under extremely corrosive conditions, without the necessity for lubrication and with very low torque requirements for opening and closing of the valve. The liner, which forms the bearing surface with the plug 25, is highly corrosion-resistant and has the necessary low coefficient of friction to permit low-torque operation. Great resistance to deformation under load and high compressive strength and stiffness are obtained by the reinforced structure of the liner, as shown and described.

Having fully described our invention, it is to be understood that we do not wish to be limited to the details set forth, but our invention is of the full scope of the appended claims.

We claim:

1. A plug valve comprising a valve body having an inlet passageway, an outlet passageway and a tapered bore transversely disposed with respect to said passageways, a tapered insert located in said tapered bore, said insert having passageways aligned with the passageways of said valve body and having a cylindrical bore, a cylindrical plug rotably mounted in said valve body and having a passageway therethrough adapted to be selectively turned into an open position or into a closed position with respect to the passageways in the valve body and in the insert, and a reinforced fluorocarbon plastic liner interposed between said insert and said plug, said liner having passageways aligned with the passageways of said valve body and a cylindrical bore forming a bearing surface for said plug, said liner being bonded to said insert.

2. A plug valve as defined in claim 1 in which the liner is filled with fiber reinforcement.

3. A plug valve as defined in claim 1 in which the liner is reinforced with glass fiber.

4. A plug valve as defined in claim 1 in which the liner is reinforced by a perforated metal plate completely imbedded therein.

5. A plug valve as defined in claim 1 in which the insert and the liner are split to provide two sections and wherein the liner plastic is filled with glass fiber and is further reinforced by means of a perforated metal plate completely imbedded within said plastic.

6. A plug valve as defined in claim 1 in which the liner plastic is filled with fiber reinforcement and is further reinforced by means of a perforated metal plate completely embedded within said plastic.

7. A plug valve comprising a valve body having an inlet passageway, an outlet passageway and a tapered bore transversely disposed with respect to said passageways, a tapered insert located in said tapered bore, said insert having passageways aligned with the passageways of said valve body and having a cylindrical bore, a cylindrical plug rotatably mounted in said valve body and having a passageway therethrough adapted to be selectively turned into an open position or into a closed position with respect to the passageways in the valve body and in the insert, and a reinforced fluorocarbon plastic liner interposed between said insert and said plug, said liner having passageways aligned with the passageways of said valve body and a cylindrical bore forming a bearing surface for said plug, said plastic liner being filled with fiber reinforcement and being further reinforced by means of a perforated metal plate completely embedded within said plastic.

8. A plug valve as defined in claim 7 wherein the insert and the liner are split to provide two sections.

References Cited in the file of this patent

UNITED STATES PATENTS

| 2,908,293 | Johnson | Oct. 13, 1959 |
| 2,911,187 | Owsley | Nov. 3, 1959 |

FOREIGN PATENTS

| 809,175 | Great Britain | Feb. 8, 1959 |
| 1,192,348 | France | Apr. 20, 1959 |